United States Patent
Hirth et al.

(10) Patent No.: US 8,498,534 B2
(45) Date of Patent: Jul. 30, 2013

(54) EPON WITH POWER-SAVING FEATURES

(75) Inventors: Ryan E. Hirth, Windsor, CA (US); Edward W. Boyd, Petaluma, CA (US); Sanjay Goswami, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 605 days.

(21) Appl. No.: 12/577,608

(22) Filed: Oct. 12, 2009

(65) Prior Publication Data

US 2010/0111523 A1   May 6, 2010

Related U.S. Application Data

(60) Provisional application No. 61/111,465, filed on Nov. 5, 2008, provisional application No. 61/221,339, filed on Jun. 29, 2009.

(51) Int. Cl.
*H04B 10/08* (2006.01)
*H04B 10/20* (2006.01)
*H04J 14/00* (2006.01)

(52) U.S. Cl.
USPC ................................. 398/25; 398/58; 398/72

(58) Field of Classification Search
USPC .................... 398/58, 59, 66–68, 70–72, 25
See application file for complete search history.

(56) References Cited

U.S. PATENT DOCUMENTS

| | | | |
|---|---|---|---|
| 6,501,574 B1 | 12/2002 | Unno et al. | |
| 7,301,970 B2* | 11/2007 | Kim et al. | 370/535 |
| 7,389,528 B1 | 6/2008 | Beser | |
| 2006/0013138 A1* | 1/2006 | Haran et al. | 370/236 |
| 2006/0029389 A1 | 2/2006 | Cleary et al. | |
| 2008/0212964 A1 | 9/2008 | Gao et al. | |
| 2009/0141661 A1* | 6/2009 | Li et al. | 370/311 |
| 2009/0263127 A1* | 10/2009 | Haran et al. | 398/38 |

FOREIGN PATENT DOCUMENTS

| | | |
|---|---|---|
| EP | 1 801 984 A1 | 6/2007 |
| EP | 1 940 051 A1 | 7/2008 |
| JP | 2008-113193 A | 5/2008 |

OTHER PUBLICATIONS

Extended European Search Report directed to related E.P. Application 09825184.6-2515, dated Nov. 22, 2012, 7 pages.
International Search Report directed toward related International Application No. PCT/US2009/060691, mailed Apr. 30, 2010 from the Korean Intellectual Property Office, Daejeon, Republic of Korea; 2 pages.
International Preliminary Report on Patnetability with Written Opinion directed toward related International Application No. PCT/US2009/060691, mailed May 10, 2011 from The International Bureau of WIPO, Geneva, Switzerland; 6 pages.
Trojer, E., "Power Saving Modes for GPON and VDSL2," *IEEE 802 LAN/MAN Standards Committee*, Ericsson AB, Kista, Sweden; 10 pages.

* cited by examiner

*Primary Examiner* — Dalzid Singh
(74) *Attorney, Agent, or Firm* — Sterne, Kessler, Goldstein & Fox P.L.L.C.

(57) ABSTRACT

One embodiment provides a system for power saving in an Ethernet Passive Optic Network (EPON). The system includes an optical line terminal (OLT), an optical network unit (ONU), a traffic-detection module configured to detect status of traffic to and from the ONU, and a power-management module configured to place the ONU in sleep mode based on the detected traffic status. The ONU includes an optical transceiver that includes an optical transmitter configured to transmit optical signals to the OLT and an optical receiver configured to receive optical signals from the OLT.

28 Claims, 7 Drawing Sheets

EPON WITH POWER-SAVING FEATURES

RELATED APPLICATION

This application claims the benefit of U.S. Provisional Applications No. 61/111,465, filed 5 Nov. 2008, and No. 61/221,339, filed 29 Jun. 2009.

BACKGROUND

1. Field

This disclosure is generally related to an Ethernet Passive Optical Network (EPON). More specifically, this disclosure is related to power-saving features of the EPON.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

In the example of an Ethernet PON (EPON), communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

Figure 1:
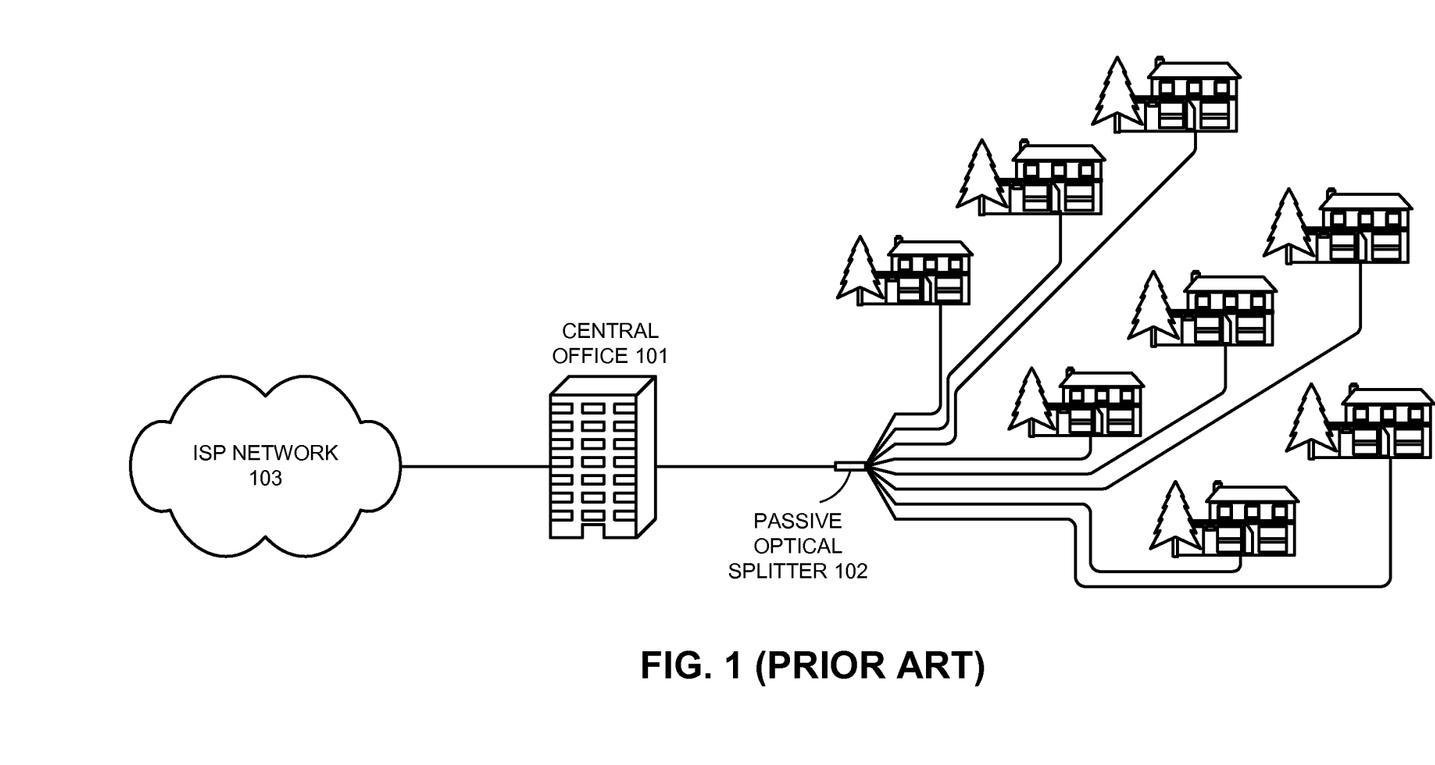
FIG. 1 presents a diagram illustrating a PON wherein a central office and a number of customers are coupled through optical fibers and a passive optical splitter (prior art).

FIG. 1 illustrates a passive optical network including a central office and a number of customers coupled through optical fibers and a passive optical splitter (prior art). A passive optical splitter 102 and optical fibers couple the customers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs) and wavelength division multiplexing (WDM) PONs.

As the popularity of EPONs increases, the number of deployed ONUs also increases. As a result, the power consumption of each ONU can no longer be ignored, and adding power-saving features to ONU design becomes increasingly important. Because of the bursty nature of the network traffic, the ONU, or at least part of the ONU, often remains inactive for a period of time. For example, the transmitter of the ONU might remain inactive unless the user is sending data packets upstream, and the receiver of the ONU might remain inactive unless the user is receiving downstream traffic. Other parts of the ONU, such as the components responsible for packet processing, media access control (MAC), error correction, etc., also may remain idle when no data traffic occurs. These idling components might consume a significant amount of power. Moreover, EPONs increasingly are carrying critical services, such as voice-over-IP (VoIP) and video data, to users. Hence, it is important to prevent any dropping of traffic and to make sure the ONU is ready to operate when needed.

SUMMARY

One embodiment provides a system for power saving in an Ethernet Passive Optic Network (EPON). The system includes an optical line terminal (OLT), an optical network unit (ONU), a traffic-detection module configured to detect status of traffic to and from the ONU, and a power-management module configured to place the ONU in sleep mode based on the detected traffic status. The ONU includes an optical transceiver that includes an optical transmitter configured to transmit optical signals to the OLT and an optical receiver configured to receive optical signals from the OLT.

In a variation on the embodiment, the traffic-detection module is located in the OLT, and the traffic-detection module is configured to determine types of traffic received from the ONU.

In a further variation, the power-management module is located in the OLT, and the power-management module is configured to instruct the ONU to enter the sleep mode based on the types of traffic sent to and received from the ONU.

In a further variation, the power-management module instructs the ONU to enter the sleep mode via an Operations, Administration, and Management (OAM) message or a multipoint control protocol (MPCP) extension message.

In a further variation, the ONU is instructed to remain in the sleep mode for a predetermined amount of time, and while the ONU is in the sleep mode, the OLT is configured to buffer downstream traffic to the ONU, and the ONU is configured to buffer upstream traffic.

In a further variation, the OLT buffers broadcast traffic and disables a broadcast queue while the ONU is in the sleep mode. In addition, the OLT disables a queue for the unicast traffic while the ONU is in the sleep mode In a variation on the embodiment, the traffic-detection module is located in the ONU, and the traffic detection module is configured to detect the presence of upstream traffic from the ONU.

In a further variation, the power-management module is located in the ONU, and in response to upstream traffic from the ONU not being present, the power-management module is configured to place the ONU in the sleep mode.

In a further variation, the traffic detection module is further configured to determine whether multicast traffic is present, and in response to the multicast traffic being present, the power-management module is configured to power down the optical transmitter, and/or one or more other power-consuming components related to transmission on the ONU.

In a further variation, the traffic-detection module is configured to detect whether a user-to-network interface located on the ONU is active, and in response to the interface being inactive, the power-management module is configured to place the ONU in the sleep mode.

In a variation on this embodiment, the ONU is configured to report a laser power-on time to the OLT via an Operations, Administration, and Management (OAM) message or a multipoint control protocol (MPCP) extension message.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

To save power consumed by an ONU, it is desirable for the ONU to power down, at least partially, during idling time periods or to power down its idling components. In addition to powering down ("going to sleep"), the ONU also needs to be able to turn on ("wake up") when it is no longer in the idle mode. Embodiments of the present invention provide a system that can select an ONU to be placed in a sleep cycle based on the ONU's traffic status. The system can power down the entire or part of the ONU or the transmitter of the ONU when link traffic is light and no time-critical traffic is detected. In one embodiment, the ONU "wakes up" when traffic is detected. To avoid traffic loss, in some embodiments, the upstream and downstream traffic are buffered by the ONU and the OLT, respectively.

Sleep Cycles

Figure 2:
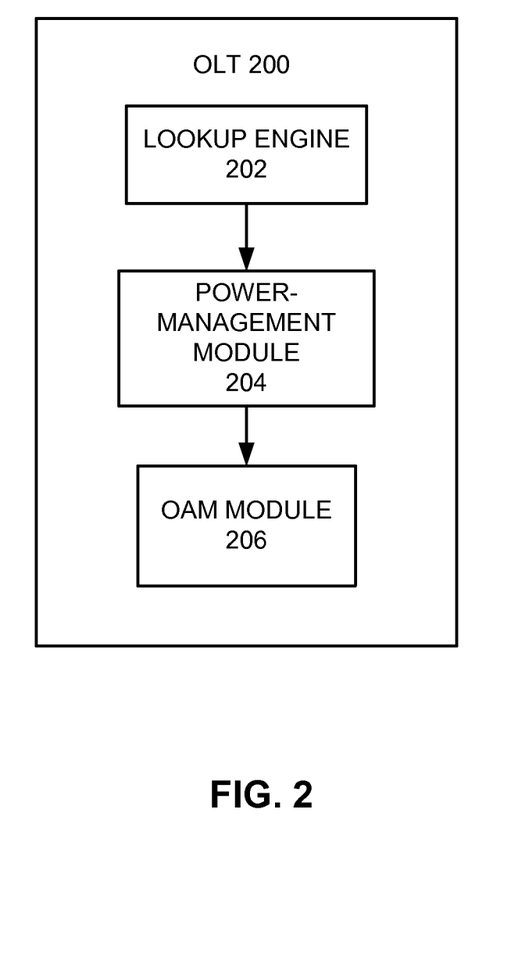
FIG. 2 presents a block diagram illustrating the architecture of an exemplary OLT in accordance with an embodiment of the present invention.

In some embodiments, the OLT monitors traffic status of all ONUs and determines their sleep eligibility. An ONU can be eligible for entering sleep cycles if the ONU traffic is low and no time-critical traffic is present. For example, this would be the case when the ONU traffic only contains Operations, Administration, and Management (OAM) traffic, Internet Control Message Protocol (ICMP), or spanning traffic. FIG. 2 presents a block diagram illustrating the architecture of an exemplary OLT in accordance with an embodiment of the present invention. An OLT 200 includes a lookup engine 202, a power-management module 204, and an OAM module 206.

During operation, OLT lookup engine 202 can characterize the traffic on the upstream and downstream links using rule-based statistics. The OLT selects ONUs for entering sleep cycles based on the characterized ONU traffic. For example, if the OLT determines that the traffic rate to and from an ONU is low based on the statistics, and no time-critical frames/packets are present, OLT power-management module 204 can put the ONU in sleep cycles. In one embodiment, OAM module 206 generates an OAM message, which is sent to the ONU to enable an ONU to enter sleep cycles. During the ONU's sleep duration, the OLT buffers the downstream unicast and broadcast traffic, while continues to transmit the multicast traffic downstream. Note that the rule-based statistics only increment for application traffic, such as VoIP or video data, and remain unchanged for network management traffic. Hence, although the ONU may detect the presence of upstream traffic, the OLT can still determine whether to put the ONU in sleep cycles based on the types of traffic received from the ONU.

The ONU sleep cycles define an ON and OFF time for the ONU. During the OFF time, one or more ONU components can be placed in sleep mode (powered down), and the sleeping-ONU buffers all upstream transmissions. In one embodiment, the ONU selected for sleep cycle also checks whether it has joined a multicast group. If the ONU determines that it has joined a multicast group, the ONU powers down only its transmitting path including the ONU transmitter and its associated control circuit. In contrast, if the ONU determines that the ONU does not have a multicast group joined, the ONU powers down both its transmitting and receiving paths. Note that in order to power down its transmitting and receiving path independently, the ONU includes separate controls for transmitter and receiver power. In a further embodiment, the high-speed serial interface, such as a SerDes, is also put in sleep mode in addition to the ONU transmitter and/or receiver.

Note that one important feature of the sleep mode is to ensure that no traffic is lost while the ONU is in sleep mode. Hence, proper packet buffering is needed. In one embodiment, the OLT buffers all broadcast traffic if the OLT determines that one or more of the coupled ONUs are in sleep mode. The OLT delays transmission of broadcast traffic until all coupled ONUs are awake. In addition, the OLT also buffers unicast traffic destined to the ONU in sleep mode. In the meantime, the ONU buffers upstream traffic.

Figure 3:
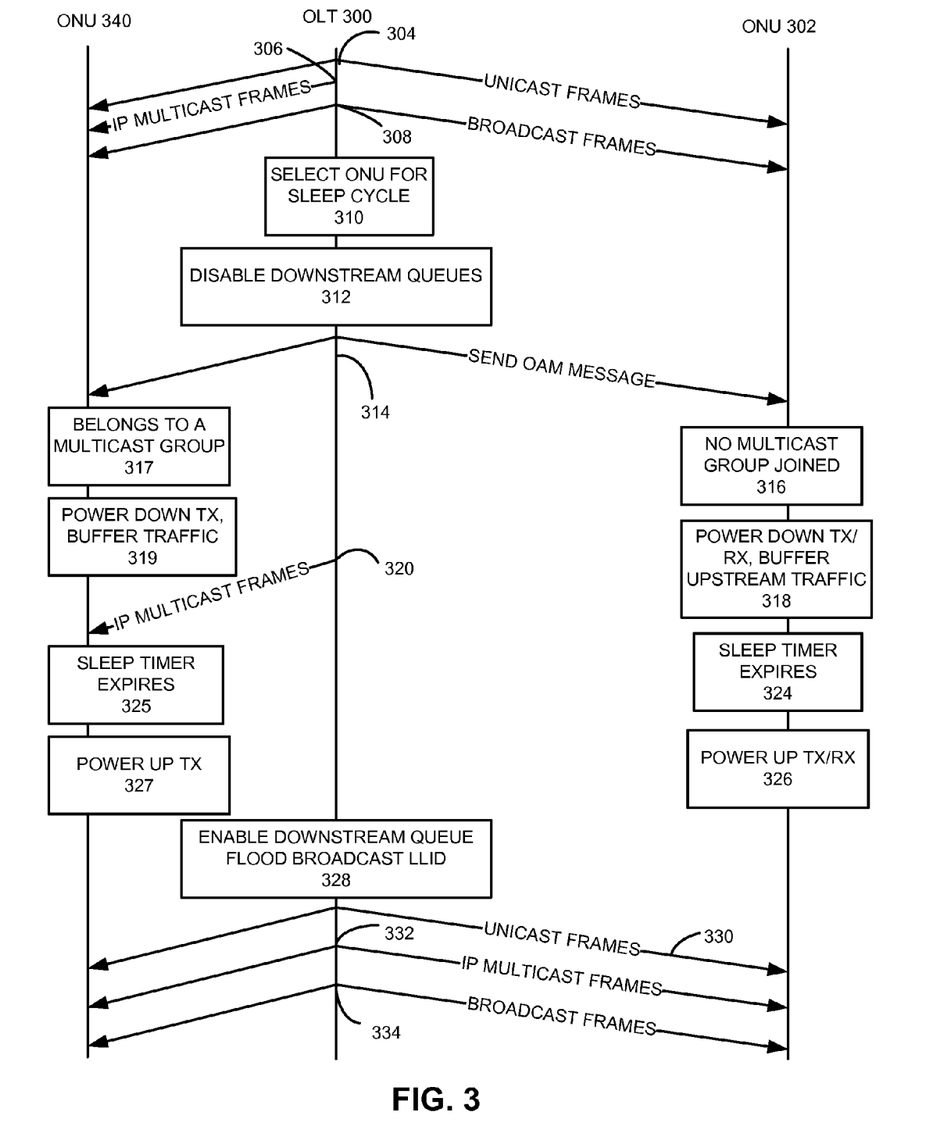
FIG. 3 presents a state diagram illustrating an ONU sleep cycle in accordance with an embodiment of the present invention.

In one embodiment, the OLT sends a message to the ONU to start the sleep cycle with a timer. Once the timer has expired, the ONU enables the transceiver interface and resumes normal transmit and receive functions. FIG. 3 presents a state diagram illustrating an ONU sleep cycle in accordance with an embodiment of the present invention. During normal operation, OLT 300 transmits unicast frames to ONUs 302 and 340 (operation 304), Internet Protocol (IP) multicast frames to ONU 340 (operation 306), and broadcast frames to ONUs 302 and 340 (operations 308). Based on traffic status, OLT 300 selects ONU 302 and ONU 340 for entering a sleep cycle (operation 310). To prepare for ONUs 302 and 340 to enter the sleep mode, OLT 300 disables its downstream unicast queues holding traffic for ONUs 302 and 340 as well as its broadcast queue (operation 312). Subsequently, OLT 300 sends an OAM message to ONUS 302 and 340 (operation 314). In one embodiment, the OAM message includes a time indicating the time period ONUs 302 and 340 should remain in sleep mode. In one embodiment, ONUs 302 and 340 receive separate OAM messages. Upon receiving the "go to sleep" OAM message, ONU 302 determines that it does not belong to any multicast group (operation 316), powers down its transceiver, and buffers its upstream traffic (operation 318). At the same time, ONU 340 determines that it belongs to a multicasting group (operation 317). As a result, ONU 340 powers down its transmitting path, and buffers its upstream traffic (operation 319). While ONUs 302 and 340 remain in the sleep mode, OLT 300 buffers all broadcast frames and unicast frames for ONUs 302 and 340, and continues to transmit multicast frames to ONU 340 (operation 320). Note that ONU 302 does not belongs to the multicast group that includes ONU 340.

Once ONU 302's sleep timer and ONU 340's sleep timer expire (operation 324 and 325), ONU 302 powers up its entire optical path (operation 326), and ONU 340 powers up its transmitting path (operation 327). OLT 300 enables its downstream unicast queue to ONUs 302 and 340, and floods broadcast LLID by transmitting all delayed broadcast frames (operation 328). Subsequently, OLT 300 resumes normal transmission by transmitting unicast frames, IP multicast frames, and broadcast frames to ONUs 302 and 340 (operations 330-334).

Figure 4:
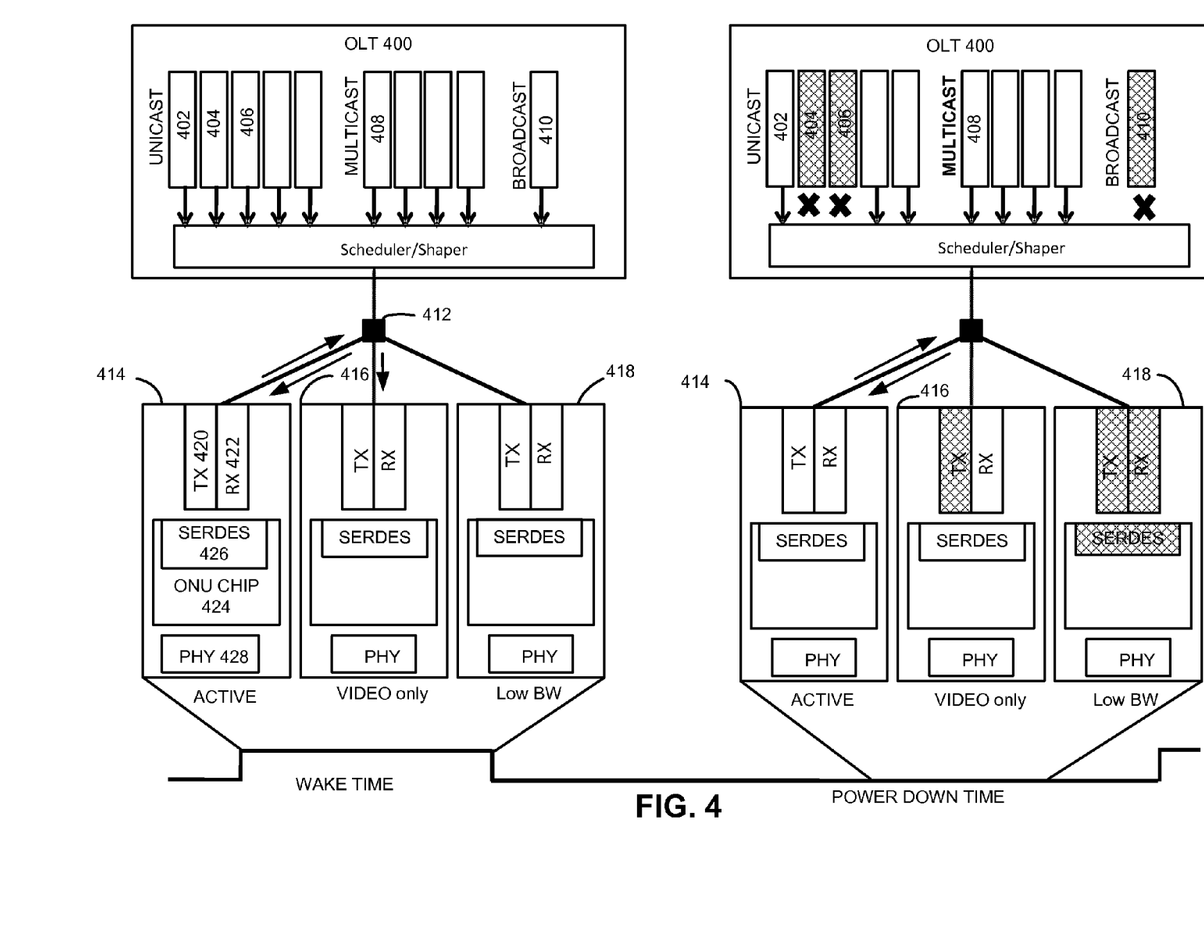
FIG. 4 presents a diagram illustrating the status of the OLT and the ONU during the ON and OFF time of a sleep cycle in accordance with an embodiment of the present invention.

FIG. 4 presents a diagram illustrating the status of the OLT and the ONU during the ON and OFF time of a sleep cycle in accordance with an embodiment of the present invention. OLT 400 includes a number of queues including unicast queues, such as queues 402-406, multicast queues, such as queue 408, and a broadcast queue 410. OLT 400 couples to a number of downstream ONUs, including ONUs 414-418, via a passive optical splitter 412. OLT unicast queues 402, 404, and 406 stores unicast traffic destined to ONU 414, 416, and 418, respectively. Each ONU includes a transmitter, a receiver, an ONU chip that includes a high-speed interface, and an Ethernet physical layer (PHY) interface. For example, ONU 414 includes a transmitter 420, a receiver 422, an ONU chip 424 which includes a serializer/deserializer (SERDES) 426, and a PHY interface 428.

During operation, OLT 400 determines which ONU is eligible to be placed in sleep mode. ONU 414 is active by transmitting upstream and receiving downstream traffic, and is not eligible for sleep. ONU 416 only receives downstream multicasting traffic, thus being eligible for sleep. For example, the subscriber might be watching TV. ONU 418 exhibits low traffic bandwidth, thus also being eligible for sleep.

During the wake time (the ON time) of a sleep cycle, all queues in OLT 400 are enabled, and all ONUs are powered up including the ONUs' transmitting and receiving paths. In one embodiment, the ONU wake time is set as 30 ms. During the power down time (the OFF time) of the sleep cycle, ONUs 416 and 418 are placed in the sleep mode. Accordingly, OLT 400 disables its unicast queues 404 and 406, and its broadcast queue 410. Because ONU 416 receives multicasting traffic, ONU 416 only powers down its transmitting path. ONU 418 powers down both of its transmitting and receiving path. In addition, ONU 418 may powers down its SERDES. In one embodiment, the power down time is set for 200 ms.

Figure 5:
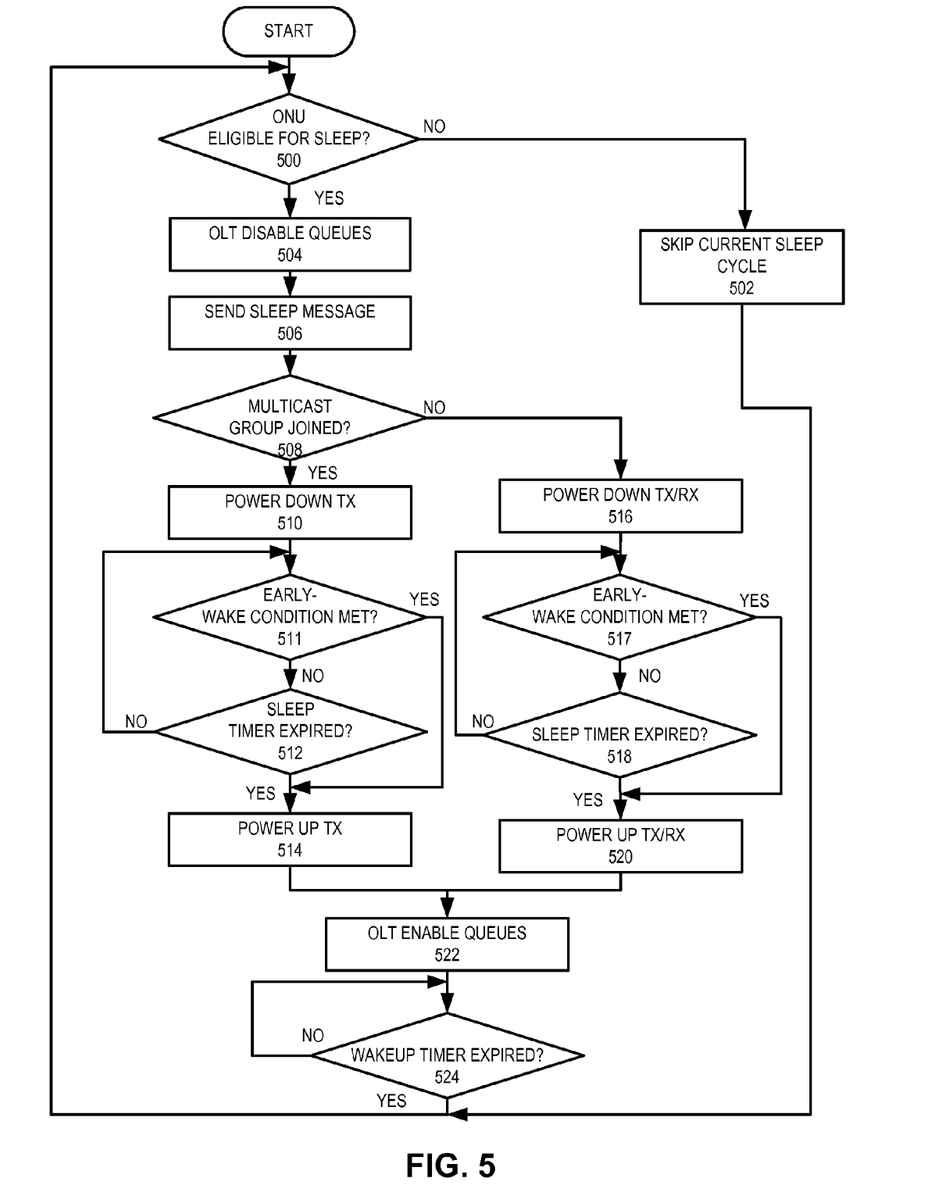
FIG. 5 presents a flow chart illustrating the process of a sleep cycle in accordance with an embodiment of the present invention.

FIG. 5 presents a flow chart illustrating the process of a sleep cycle in accordance with an embodiment of the present invention. At the beginning of the sleep cycle, the OLT determines whether the ONU is eligible for sleep (operation 500). If not, the ONU is skipped for this sleep cycle (operation 502). Otherwise, the OLT disables its downstream broadcast queue and unicast queue for the ONU to disable downstream broadcast and unicast traffic (operation 504), and sends a sleep message to the ONU (operation 506). Upon receiving the sleep message, the ONU determines whether it has joined any multicast group (operation 508). If so, the ONU powers down its upstream transmit optical path component, such as a transmitter, and disables its upstream traffic to the OLT (operation 510). During sleep, the ONU determines whether an "early-wake" condition is met (operation 511). In one embodiment, the "early-wake" conditions include, but are not limited to: time-critical upstream traffic detected, new multicast group joined (such as IPTV channel change is detected), an alarm condition (e.g., dying gasp alarm), and that an upstream queue has crossed certain threshold. If so, the ONU initializes an "early-wake" operation by powering up its upstream optical path components and enables upstream traffic to the OLT (operation 514). If not, the ONU determines whether its sleep timer is expired (operation 512). Note that the sleep time defines a time period that the ONU stays power down. If so, the ONU powers up its upstream optical path components and enables upstream traffic to the OLT (operation 514). Otherwise, the system returns to operation 511.

If the ONU determines that it has not joined a multicast group (operation 508), the ONU powers down its upstream and downstream optical path components, such as a transmitter and a receiver, and disables upstream traffic to the OLT (operation 516). During sleep, the ONU determines whether an "early-wake" condition is met (operation 517). If so, the ONU initializes an "early-wake" operation by powering up all of its optical path components and enables traffic to and from the OLT (operation 520) If not, the ONU further determines whether its sleep timer is expired (operation 518). If so, the ONU powers up all of its optical path components and enables traffic to and from the OLT (operation 520). Otherwise, the system returns to operation 517.

After the ONU power up, the OLT enables its unicast and broadcast queues to enable its downstream transmission to the ONU (operation 522). The OLT then waits for its wakeup timer to expire (operation 524). Note that the wakeup timer defines a time period that the ONU stays awake. After the expiration of the wakeup timer, a new sleep cycle can start.

The maximum time for an ONU to remain in the sleep mode can be limited by the buffer capacity of the OLT and the ONU and other user considerations. There is a tradeoff between the amount of power saved and the risk of losing user traffic or delay of user applications. If the time interval between two sleep cycles (corresponding to a maximum sleep time) is too short, the amount of power saved can be limited. On the other hand, a longer time interval between two consecutive sleep cycles increases the risk of the loss of user traffic due to OLT or ONU buffer overflow.

In addition to the maximum sleep time, the ONU can also notify the OLT of its minimum sleep time. The minimum sleep time of the ONU may be determined by the turn-on time of its transmitter (the time required for the transmitter to stabilize after power-on). If the OLT determines that the time interval between the ONU power-off and the next scheduled ONU wake-up is less than the minimum ONU sleeping time, the OLT may prevent the ONU from entering the sleep mode. Note that the turn-on time of the ONU transmitter is determined by the type of lasers used, and the ONU can notify the OLT about such a parameter via an OAM message or a multipoint control protocol (MPCP) extension message. In addition to using the laser turn-on time to set the ONU minimum sleep time, in one embodiment, the OLT is configured to take into consideration the laser turn-on time when scheduling its transmission after a downstream ONU wakes up. For example, if an ONU is scheduled to come out of sleep mode at a time $t_0$, and the OLT knows the turn-on time of the ONU laser is $\Delta t$, then the OLT will schedule the ONU's upstream transmission at a time later than $t_0 + \Delta t$.

It is also possible to allow the ONU to synchronize its power-down cycle with the MPCP ONU-polling cycle, which can be adaptively adjusted based on the ONU traffic status. In one embodiment, the OLT periodically polls the ONU for its status. If the ONU reports no traffic within one ONU polling cycle, the OLT can instruct the ONU to "go to sleep" or to power down until the scheduled time for the next ONU polling. Furthermore, the OLT can decrease the ONU polling rate, or increase the waiting time before the next ONU polling, if the ONU reports no traffic at a following polling time. Once the ONU reports the presence of traffic, the OLT instructs the ONU to "wake up," and resumes its original ONU polling rate.

Note that, because the ONU monitors and reports traffic at each polling time, alternatively the ONU can wake up on its own without receiving an instruction from the OLT. In certain cases, one ONU is assigned with multiple LLIDs all sharing the same transmitter and receiver. In order to save power, the OLT can group the multiple LLIDs together, and send a REPORT for these LLIDs in the same polling cycle. The OLT instructs the ONU to enter sleep mode if all LLIDs report zero traffic.

Sleep/Wake up on Detection

Figure 6:
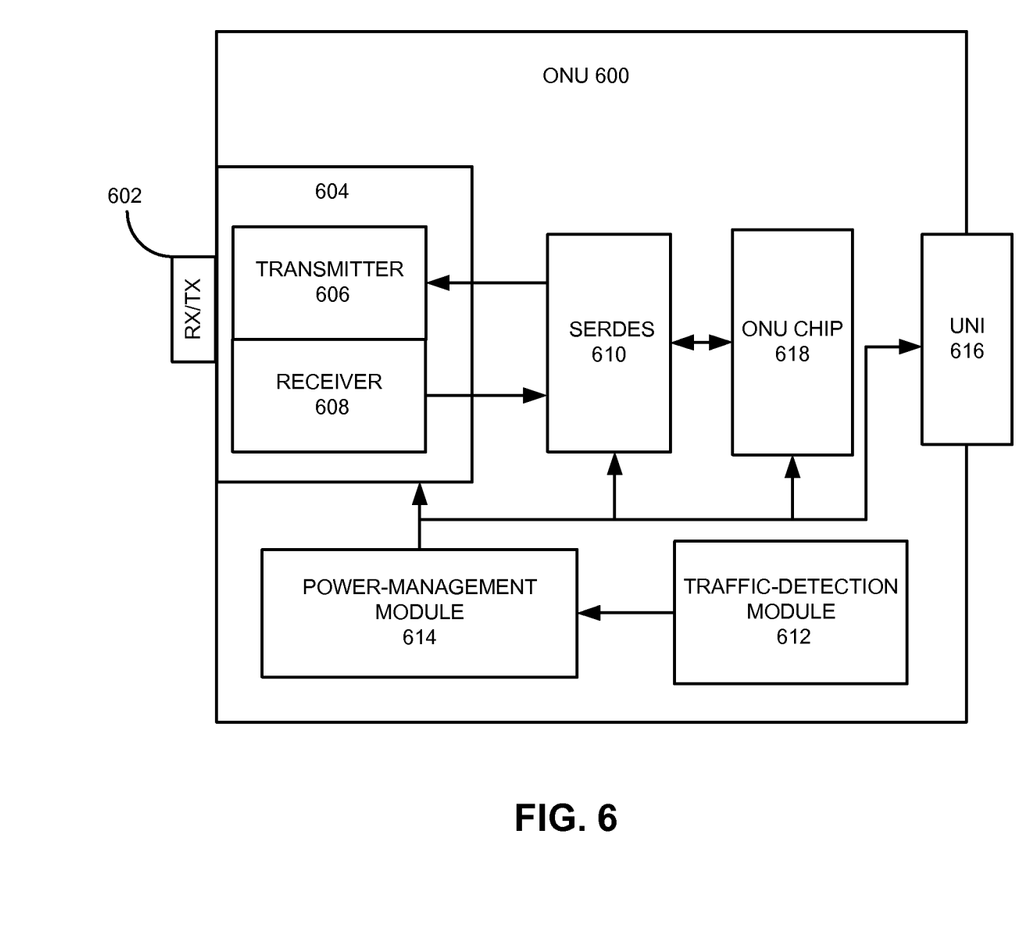
FIG. 6 presents a block diagram illustrating the architecture of an exemplary ONU in accordance with an embodiment of the present invention.

In some embodiments, the system determines whether to allow the ONU to enter sleep mode based on the ONU monitoring the user traffic. FIG. 6 presents a block diagram illustrating the architecture of an exemplary ONU in accordance with an embodiment of the present invention. In FIG. 6, an ONU 600 includes an optical interface 602 for coupling to an optical fiber, an optical bi-directional transceiver 604 coupled to optical interface 602, a Serializer/Deserializer (SerDes) 610, a traffic-detection module 612, a power-management module 614, a user-to-network interface (UNI) 616 for receiving user data, and an ONU chip 618 which is implemented in an application-specific integrated circuit (ASIC).

Optical bi-directional transceiver 604 includes an optical transmitter 606 and an optical receiver 608. Through optical interface 602, optical transmitter 606 transmits optical signals to the optical fiber and optical receiver 608 receives optical signals from the same optical fiber. A high-speed serial interface, such as a SerDes 610 is coupled to optical transceiver 604.

Traffic-detection module 612 can detect the status of the UNI link coupled to UNI 616. For example, if no Ethernet cable is plugged in UNI 616, traffic-detection module 612 detects that the UNI link is down. In such a case, ONU 600 can go into sleep mode since it is not in use. In one embodiment, ONU 600 goes into sleep mode by powering down a number of components including transmitter 606, receiver 608, SerDes 610, ONU chip 618, and other components that may consume power. However, while in sleep mode, ONU 600 is still able to monitor the link status of UNI 616. For example, traffic-detection module 612 can remain awake while the rest of ONU 600 goes into sleep mode. Once the link status of UNI 616 is up, such as an Ethernet cable being plugged in UNI 616, ONU 600 is able to come out of the sleep mode (wake up).

In addition to detecting the UNI link status, traffic-detection module 612 can also detect whether ONU 600 is receiving any upstream traffic from the user via UNI 616. In one embodiment, if it is determined that ONU 600 has not received any upstream traffic for a certain amount of time, power-management module 614 can put transmitter 606 and its associated control circuit in sleep mode. Note that in such a case the OLT still keeps ONU 600 registered although the OLT is not receiving reports back from ONU 600 for polling. When traffic-detection module 612 detects the presence of upstream traffic, power-management module 614 wakes up transmitter 606 and its associated control circuit. Transmitter 606 then starts to transmit traffic upstream to the OLT.

To avoid multicast traffic loss, in one embodiment, traffic-detection module 612 also detects the presence of multicast traffic by detecting whether ONU 600 has joined a multicast group. If it is determined that ONU 600 does not belong to any multicast group, power-management module 614 can put receiver 608 in sleep mode. While ONU 600 is in sleep mode, traffic-detection module 612 continues to detect whether ONU 600 joins a multicast group, and if traffic-detection module 612 detects a new multicast join, ONU 600 will be brought out of sleep mode.

Figure 7:
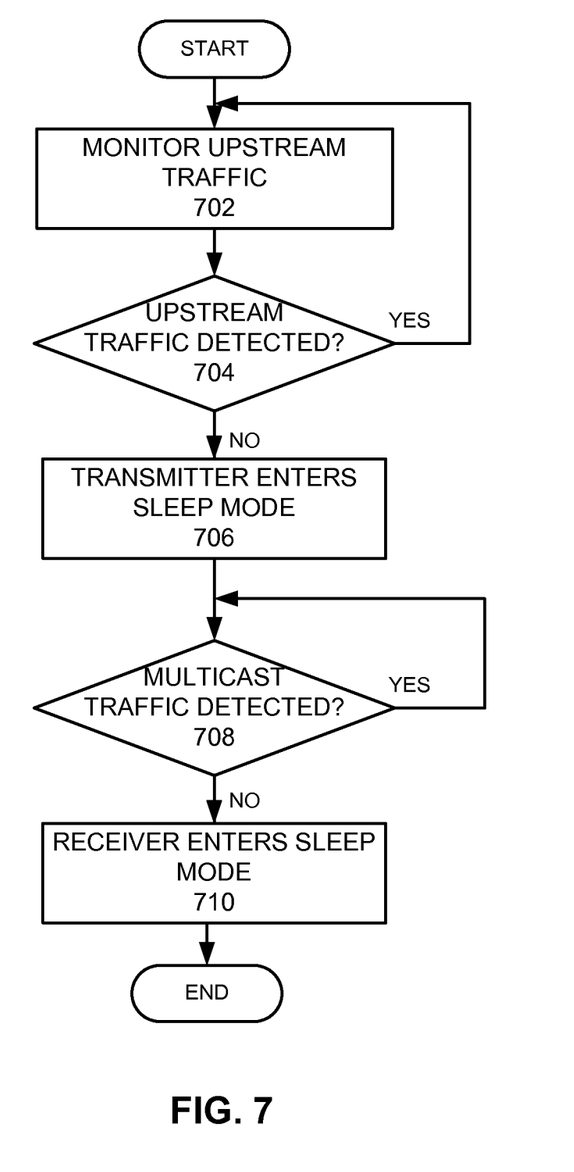
FIG. 7 presents a flow chart illustrating a process of an ONU going to sleep mode in accordance with one embodiment of the present invention.

FIG. 7 presents a flow chart illustrating a process of an ONU going to sleep mode in accordance with one embodiment of the present invention. During operation, the ONU (periodically) monitors its upstream traffic (operation 702), and determines whether upstream traffic is present (operation 704). If no upstream traffic is present, the ONU transmitter enters sleep mode (operation 706). The ONU also detects whether multicast traffic is present (operation 708), and if not, the ONU receiver enters sleep mode (operation 710).

In one embodiment, when the only traffic received by an ONU in sleep mode is network management traffic, such as simple network management protocol (SNMP) messages, spanning tree protocol (STP) messages, Internet control message protocol (ICMP) messages, etc., and no application data, such as VoIP and video, is present, the ONU can periodically wake up to process downstream broadcast and any management packets, and then go back to sleep afterward.

In some embodiments, the ONU also includes a power meter that measures the ONU's power usage. The power meter can measure the ONU's power usage during its wake and sleep times, and calculate an estimate of the power consumed by the ONU. In one embodiment, the ONU can report its power usage statistics to the OLT via an OAM message or a simple network management protocol (SNMP) message.

In some embodiments, the network management system (NMS) has the ability to enable/disable the power-saving feature of each individual ONUs. In addition, the power-management module reports to the NMS the total time an ONU has been placed in the sleep mode as well as the amount of power saved during such time period. Based on such statistics, the NMS may decide to enable/disable the power-saving feature of the ONU. Moreover, the NMS can configure the traffic-detection module by selecting the types of traffic that can be buffered and processed later when an ONU is in the sleep mode.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for providing power saving in an Ethernet Passive Optical Network (EPON), comprising:
an optical line terminal (OLT);
an optical network unit (ONU), the ONU comprising an optical transceiver comprising:
an optical transmitter configured to transmit optical signals to the OLT, and
an optical receiver configured to receive optical signals from the OLT;
a traffic-detection module configured to detect a type of traffic transmitted to and from the ONU; and
a power-management module configured to place the ONU in sleep mode based on the type of traffic,
wherein, while the ONU is in the sleep mode, the OLT is configured to buffer downstream traffic to the ONU, and the ONU is configured to buffer upstream traffic.

2. The system of claim 1, further comprising an Operations, Administration, and Management (OAM) module that is located in the OLT.

3. The system of claim 1, wherein the power-management module is configured to instruct the ONU to enter the sleep mode.

4. The system of claim 3, wherein the power-management module instructs the ONU to enter the sleep mode via an Operations, Administration, and Management (OAM) message or a multipoint control protocol (MPCP) extension message.

5. The system of claim 1, wherein, while the ONU is in the sleep mode, the OLT is further configured to:
buffer broadcast traffic;
disable a broadcast queue; and
disable a queue for unicast traffic.

6. The system of claim 1, wherein the traffic-detection module is configured to detect the presence of upstream traffic from the ONU.

7. The system of claim 1, wherein, in response to the upstream traffic being absent from the ONU, the power-management module is configured to place the ONU in the sleep mode.

8. The system of claim 1, wherein the traffic-detection module is further configured to determine whether multicast traffic is present, such that in response to the multicast traffic being present, the power-management module is configured to power down at least one of the optical transmitters or other power-consuming components.

9. The system of claim 1, wherein the traffic-detection module is further configured to detect whether a user-to-network interface located on the ONU is active, such that in response to the interface being inactive, the power-management module is configured to place the ONU in the sleep mode.

10. The system of claim 1, wherein the ONU is configured to report a laser power-on time to the OLT via an Operations, Administration, and Management (OAM) message or a multipoint control protocol (MPCP) extension message.

11. A method for providing power saving in an Ethernet Passive Optical Network (EPON), comprising:
detecting, using a traffic detection module, a type of traffic transmitted to and from an optical network unit (ONU);
placing, using a power-management module, the ONU in sleep mode based on the type of traffic; and
buffering traffic while the ONU is in the sleep mode, wherein the buffering comprises:
buffering downstream traffic at an optical line terminal (OLT); and
buffering upstream traffic at the ONU.

12. The method of claim 11, wherein the detecting is performed by the OLT coupled to the ONU.

13. The method of claim 11, wherein the placing is performed by the OLT instructing the ONU to enter the sleep mode based on the type of traffic sent to and received from the ONU.

14. The method of claim 11, further comprising instructing the ONU to enter the sleep mode via an Operations, Administration, and Management (OAM) message or a multipoint control protocol (MPCP) extension message.

15. The method of claim 11, further comprising, while the ONU is in the sleep mode:
buffering broadcast traffic;
disabling a broadcast queue at the OLT; and
disabling a queue for unicast traffic at the OLT.

16. The method of claim 11, wherein the detecting comprises determining the presence of upstream traffic from the ONU.

17. The method of claim 11, wherein the placing is in response to the upstream traffic being absent from the ONU.

18. The method of claim 11, wherein:
the detecting further comprises determining whether multicast traffic is present; and
powering down at least one optical transmitter or other power-consuming components in response to the multicast traffic being present.

19. The method of claim 11, wherein the placing is in response to a user-to-network interface located on the ONU being inactive.

20. The method of claim 11, further comprising transmitting from the ONU a laser power-on time to the OLT via an Operations, Administration, and Management (OAM) message or a multipoint control protocol (MPCP) extension message.

21. An optical network unit (ONU) for facilitating power saving operation, comprising:
  an optical transceiver comprising:
    an optical transmitter configured to transmit optical signals to an optical line terminal (OLT), and
    an optical receiver configured to receive optical signals from the OLT;
  a traffic-detection module configured to detect a type of traffic transmitted to and from the ONU; and
  a power-management module configured to place the ONU in sleep mode based on the type of traffic,
  wherein, while the ONU is in the sleep mode, the OLT is configured to buffer downstream traffic to the ONU, and the ONU is configured to buffer upstream traffic.

22. The ONU of claim 21, wherein the traffic-detection module is configured to detect the presence of upstream traffic from the ONU, and in response to the upstream traffic being absent from the ONU, the power-management module is configured to place the ONU in the sleep mode.

23. The ONU of claim 21, wherein the traffic-detection module is further configured to determine whether multicast traffic is present, such that in response to the multicast traffic being present, the power-management module is configured to power down at least one of the optical transmitters or other power-consuming components.

24. The ONU of claim 21, wherein the traffic-detection module is further configured to detect whether a user-to-network interface located on the ONU is active, such that in response to the interface being inactive, the power-management module is configured to place the ONU in the sleep mode.

25. The ONU of claim 21, further comprising a report mechanism configured to report a laser power-on time to the OLT via an Operations, Administration, and Management (OAM) message or a multipoint control protocol (MPCP) extension message.

26. An optical line terminal (OLT) for power saving in an Ethernet Passive Optical Network (EPON), comprising:
  a traffic-detection module configured to detect a type of traffic transmitted to and from an optical network unit (ONU) coupled to the OLT; and
  a power-management module configured to put the ONU in sleep mode based on the type of traffic,
  wherein, while the ONU is in the sleep mode, the OLT is configured to buffer downstream traffic to the ONU, and the ONU is configured to buffer upstream traffic.

27. The OLT of claim 26, wherein the power-management module is further configured to instruct the ONU to enter the sleep mode via an Operations, Administration, and Management (OAM) message or a multipoint control protocol (MPCP) extension message.

28. The OLT of claim 26, wherein, while the ONU is in the sleep mode, the OLT is further configured to:
  buffer broadcast traffic;
  disable a broadcast queue; and
  disable a queue for unicast traffic.

* * * * *